(12) United States Patent
Liu et al.

(10) Patent No.: US 12,248,523 B1
(45) Date of Patent: Mar. 11, 2025

(54) FRUSTRATION SCORING SYSTEM

(71) Applicant: Content Square SAS, Paris (FR)

(72) Inventors: Mengzhu Liu, Paris (FR); Mohammad Reza Loghmani, Paris (FR); Philipe Moura, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/427,170

(22) Filed: Jan. 30, 2024

(51) Int. Cl.
  *G06F 16/00* (2019.01)
  *G06F 16/95* (2019.01)
  *H04L 67/50* (2022.01)

(52) U.S. Cl.
  CPC ............ *G06F 16/95* (2019.01); *H04L 67/535* (2022.05); *G06F 2216/03* (2013.01)

(58) Field of Classification Search
  CPC ...... G06F 16/95; G06F 2216/03; G06F 11/34; G06F 33/3438; H04L 67/535
  USPC ........................................................ 707/707
  See application file for complete search history.

(56) References Cited

U.S. PATENT DOCUMENTS

| | | | | |
|---|---|---|---|---|
| 11,775,869 | B1 * | 10/2023 | Mishraky | G06F 21/45 706/12 |
| 2004/0204983 | A1 * | 10/2004 | Shen | G06Q 30/0273 705/14.69 |
| 2022/0245013 | A1 * | 8/2022 | Ciabarra, Jr. | G06F 11/0778 |
| 2023/0033680 | A1 * | 2/2023 | Whatley | G06F 18/2134 |
| 2023/0061947 | A1 * | 3/2023 | Caron | G06N 5/02 |
| 2023/0090695 | A1 * | 3/2023 | Kelkar | G06Q 30/0282 705/7.29 |
| 2023/0187813 | A1 * | 6/2023 | Mestres | H01Q 1/2283 257/728 |

* cited by examiner

*Primary Examiner* — Vincent F Boccio
(74) *Attorney, Agent, or Firm* — Schwegman Lundberg & Woessner, P.A.

(57) ABSTRACT

Systems and methods provide for deriving values for a set of features, for each session of a plurality of sessions that each comprise one or more actions performed by a given user on one or more webpages of a website. The systems and method further provide for generating an initial frustration score for each session of the plurality of sessions by analyzing the set of features for each session of the plurality of sessions using a first machine learning model trained to generate an initial frustration score based on values derived for a set of features for each session of a given set of sessions. The systems and methods further add the initial frustration score to the set of features to generate an updated set of features for each session and generate a final frustration score for each session of the plurality of sessions by analyzing the updated set of features using a second machine learning model trained to generate a final frustration score based on the initial frustration score and features derived for each session of a given set of sessions.

20 Claims, 11 Drawing Sheets

FIG. 7

FRUSTRATION SCORING SYSTEM

BACKGROUND

The Internet is a collection of disparate computer systems which use a common protocol to communicate with each other. A common use of the Internet is to access websites. Websites are typically stored on a server and remotely accessed by a computing device over the Internet using a web browser.

To increase user visitations and revenue, websites have become very sophisticated. Websites typically include webpages that provide information to users, advertise products or services to users and/or provide site search functions for users. A problem for website owners is how to measure the user experience to determine how successful the website is, for example, whether the informational or other needs of users are met and whether the users are purchasing goods and services advertised on their site. Techniques have been developed for recording user activity (events such as URLs accessed and the like) on websites to generate event streams and analytics to determine the success of a website, among other things. Discovering important patterns, however, is very challenging.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIGS. 7-9 illustrate user interfaces, in accordance with some examples.

DETAILED DESCRIPTION

As explained above, techniques have been developed for recording user activity (events such as URLs accessed and the like) on websites to generate event streams and analytics to determine the success of a website, among other things. These techniques produce a lot of data in even just a day of recordings of users' activities. Some technical problems include how to determine, based on this data, whether a user had a good experience with a webpage or a website or a bad or frustrating experience with the webpage or website and what are the issues that led to that experience. For example, if a user encountered particular errors or had issues with loading times while viewing a webpage or website, it is difficult for a system to determine whether or not the session overall was a good experience or a frustrating experience for the user. Accordingly, it is difficult to determine what issues led to the greatest frustrations levels to determine how to refactor and improve user experience.

To address this and other technical problems a computing system is described herein that derives values for a set of features for each session of a plurality of sessions. Each session of the plurality of sessions comprises one or more actions performed by a given user on one or more webpages of a website. The computing system generates an initial frustration score for each session of the plurality of sessions by analyzing the set of features for each session of the plurality of sessions using a first machine learning model trained to generate an initial frustration score based on values derived for a set of features for each session of a given set of sessions. The computing system appends the initial frustration score to the set of features to generate an updated set of features for each session. The computing system generates a final frustration score for each session of the plurality of sessions by analyzing the updated set of features using a second machine learning model trained to generate a final frustration score based on the initial frustration score and features derived for each session of a given set of sessions. The final frustration score can be used to rank sessions, generate statistics regarding frustration issues, among other use cases.

Networked Computing Environment

Figure 1:
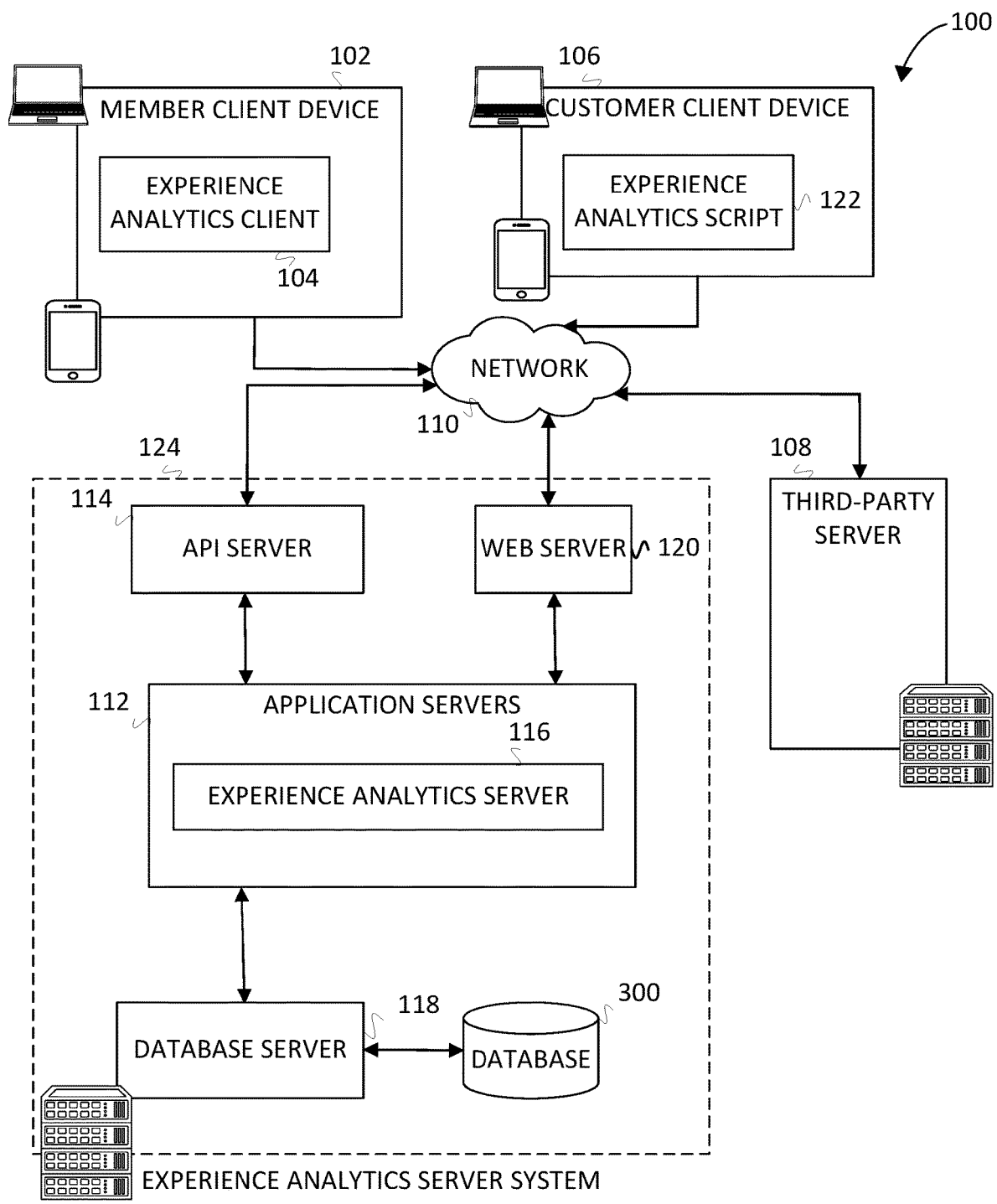
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a website, mobile websites, and applications. The experience analytics system 100 can include multiple instances of a member client device 102, multiple instances of a customer client device 106, and multiple instances of a third-party server 108.

The member client device 102 is associated with a client (also referred to herein as an "entity") of the experience analytics system 100, where the client has a website hosted on the client's third-party server 108. For example, the client can be a retail store that has an online retail website that is hosted on a third-party server 108. An agent of the client, such as a web master or an employee, can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications, such as Chrome or Safari. The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data (also referred to here as "events") including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124 includes functions, such as commands to invoke functions, as well as payload data, such as website data, texts reporting errors, insights, merchandising information, adaptability information, images, graphs providing visualizations of experience analytics, session replay videos, and zoning and overlays to be applied on the website.

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112 and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning, and overlays to be applied on the website, and so forth.

The application servers 112 host a number of server applications and subsystems, including, for example, an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, and so forth, received from multiple instances of the experience analytics script 122 on customer client devices 106. The experience analytics server 116 implements processing technologies and functions related to generating user interfaces including information on errors, insights, merchandising information, adaptability information, images, graphs providing visualizations of experience analytics, session replay videos, zoning, and overlays to be applied on the website, and so forth. Other processor and memory intensive processing of data may also be performed server-side by the experience analytics server 116, in view of the hardware requirements for such processing.

System Architecture

Figure 2:
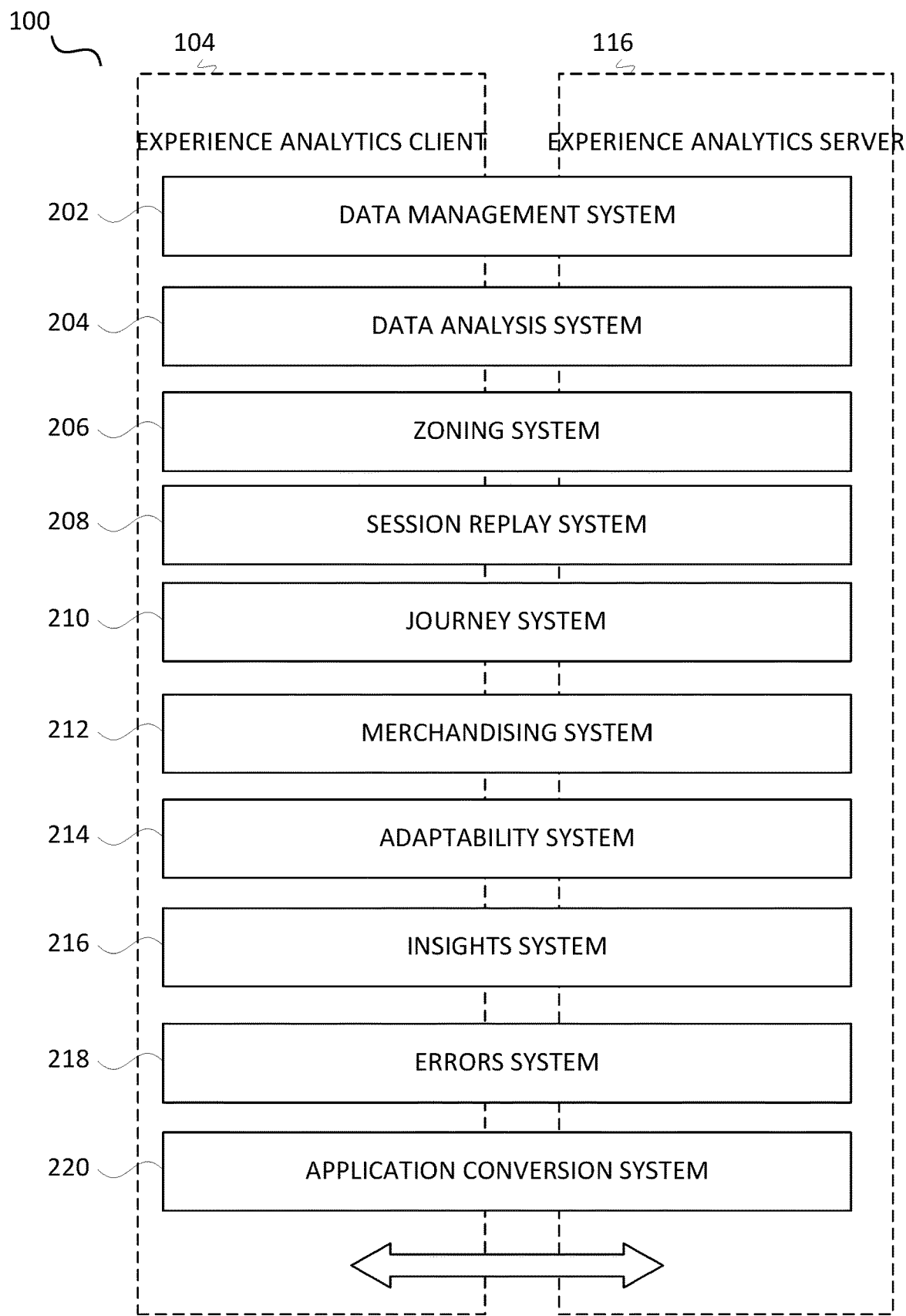
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element displayed on the website (e.g., an icon, a text link). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter). The session replay interface allows the client via the member client device 102 to select and view each of the session replays. In one example, the session replay interface can also include an identification of events (e.g., failed conversions, angry customers, errors on the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages and the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on merchandise to be promoted on the website, optimization of sales performance, items in the client's product catalog on a granular level, competitor pricing, and the like. The merchandising interface can, for example, comprise graphical data visualization pertaining to product opportunities, category, brand performance, and so forth. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 to surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, and so forth. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey on the website and the page that adversely affects (e.g., causes frustration for) the users on customer client devices 106 who are visiting the client's website. The errors can also include causes of looping behaviors by the users, in-page issues such as unresponsive calls to action and slow loading pages. The errors can be displayed by the member client devices 102 via the experience analytics client 104 on a dashboard of a user interface, as a pop-up element, as a separate panel, and the like. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website or to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Data Architecture

Figure 3:
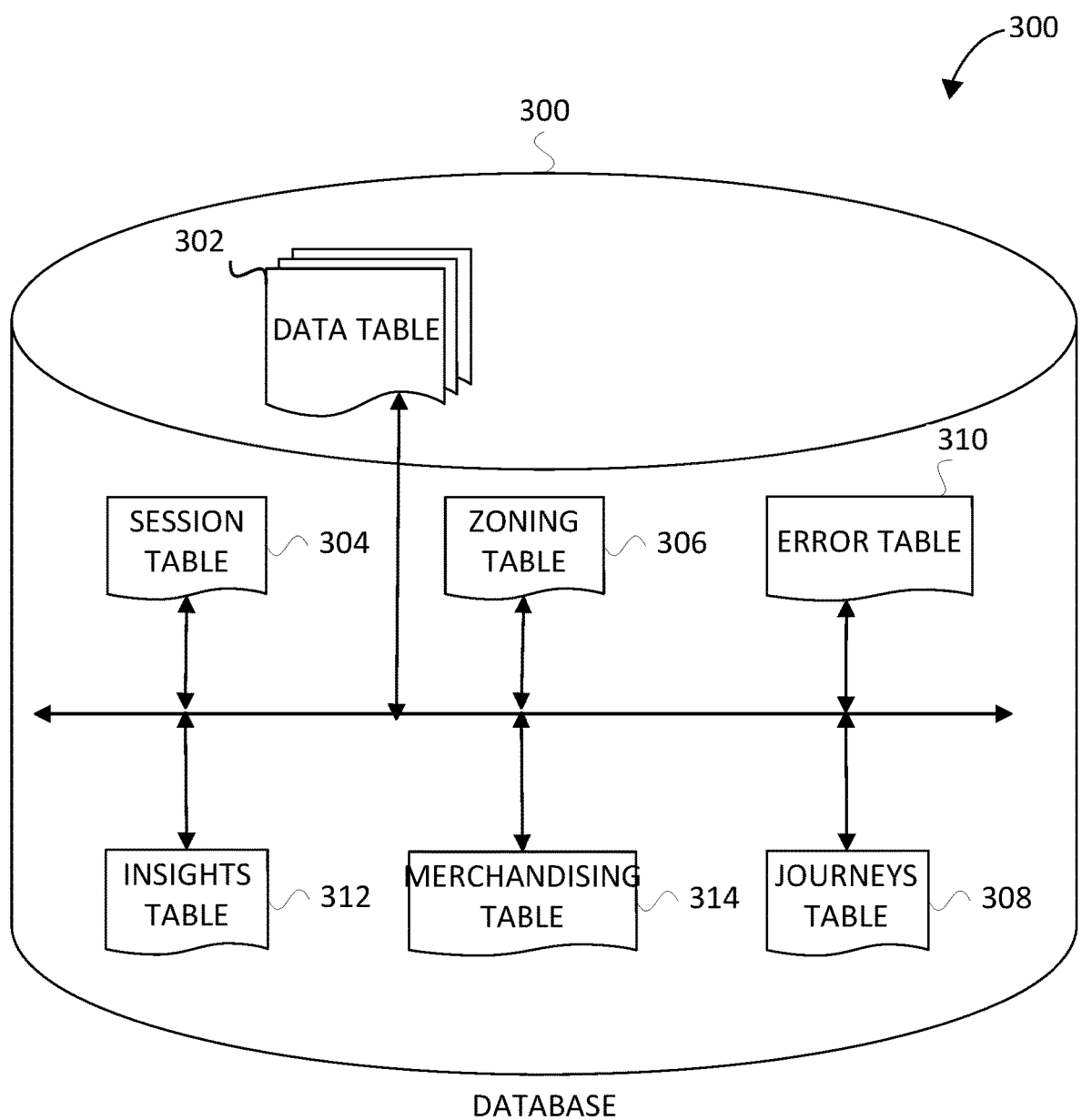
FIG. 3 is a diagrammatic representation of a data structure as maintained in a database, in accordance with some examples.

FIG. 3 is a schematic diagram illustrating database 300, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The data table 302 can also store data tags and results of data science and data engineering processes on the data. The data table 302 can also store information such as the font, the images, the videos, the native scripts in the website or applications, and so forth.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights system 216.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities the performance of the products based on the zones in the website or application, and so forth.

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, and so forth. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
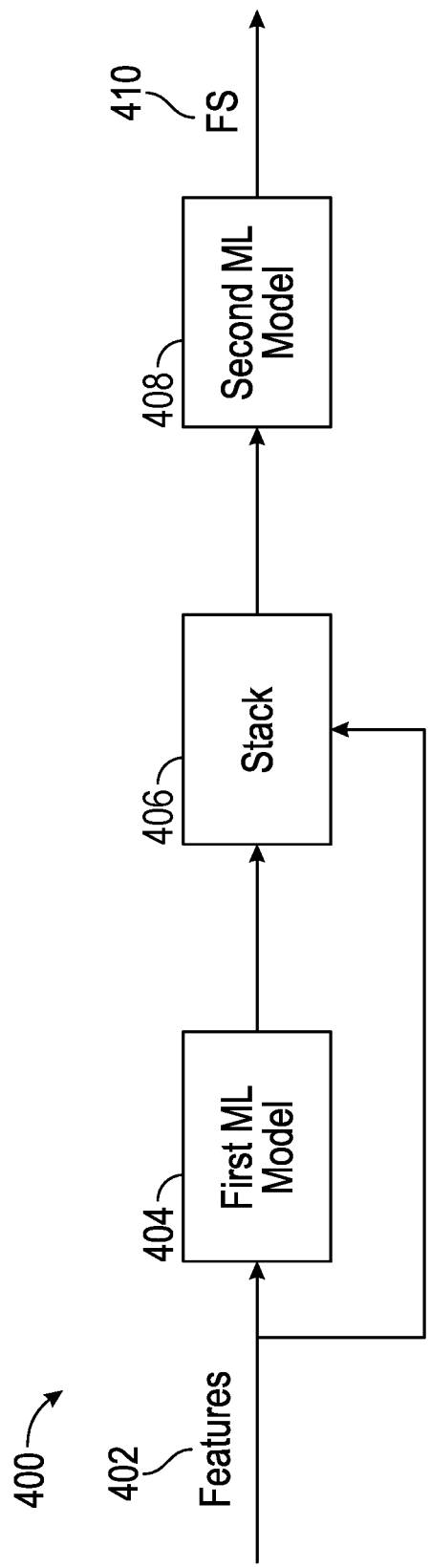
FIG. 4 is a block diagram illustrating a frustration scoring system, in accordance with some examples.

FIG. 4 is a block diagram illustrating an overview of a frustration scoring system 400. In some examples, the frustration scoring system 400 is part of the experience analytics server system 124 and can run on an application server 112, such as the experience analytics server 116.

In the frustration scoring system 400, a set of features are input to a first machine learning model 404 to generate an initial frustration score. In some examples the first machine learning model is a decision tree model. It is to be understood that other types of machine learning models can be used in example embodiments. The set of features 402 are also provided to the stack component 406. The set of features can comprise one or more features, such as a rage click, multiple use element, low activity, any javascript error, a javascript error after a click, excessive hovers, multiple button interactions, multiple field interactions, load time, any API error, an API error after a click, looping, page not consumed, custom error, dead click, dead link, page reload, blank page, thrashed cursor, dead zoom, application not responsive, application crash, and so forth, as explained in more detail below. Values for these features are derived from session data stored for each session of a plurality of sessions. A session comprises one or more actions performed by a given user on one or more webpages of a website (with personal information removed or obscured).

The initial frustration score is provided to the stack component 406. The stack component 406 appends the initial frustration score to the features (e.g., as an additional feature) to generate an updated set of features. The updated set of features are input to the second machine learning model 408 to generate a final frustration score 410 for a session. In some examples the second machine learning model is a logistic regression model. It is to be understood that other types of machine learning models can be used in example embodiments. In some examples, the second machine learning model 408 also outputs a frustration score for each feature in the set of features. Further details are provided below.

Figure 5:
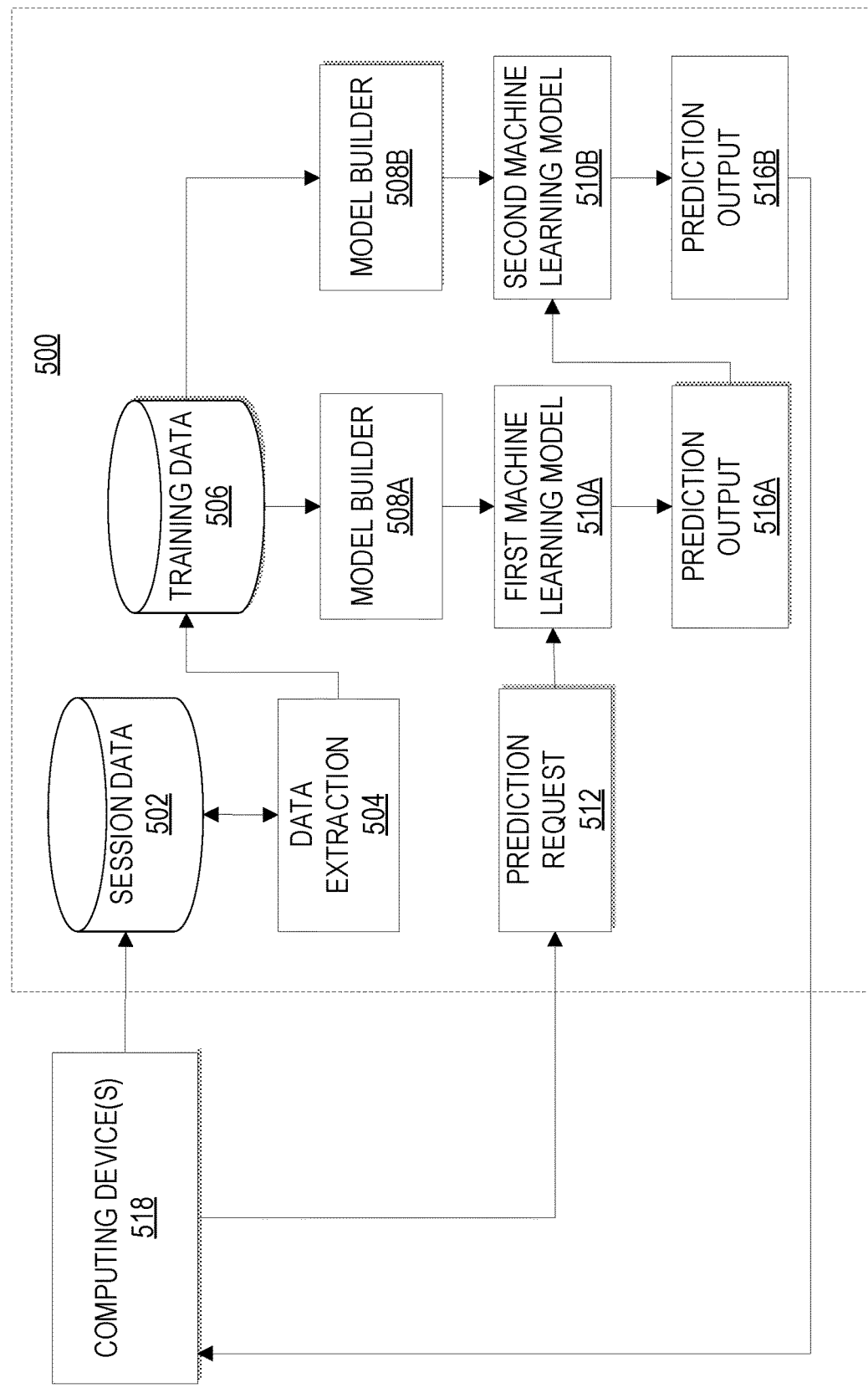
FIG. 5 is a block diagram illustrating a machine learning modeling system, in accordance with some examples.

FIG. 5 is a block diagram illustrating a machine learning modeling system 500 that can be part of experience analytics server system 124. Computing devices 518, such as member client devices 102 and/or customer client devices 106, generate session data which is received by a server system, such as experience analytics server system 124 and can be stored as session data in one or more databases 502 to be used to extract data for training the first machine learning model 510A and/or the second machine learning model 510B.

As explained above, in some examples, the experience analytics script 122 records data (also referred to as "events") including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, and so forth. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110. In some examples, this data is stored as session data 502. The session data can be used to generate session replays (e.g., recordings) for a user to replay the session in an order though which a user navigated through one or more webpages during the session.

Data extraction 504 extracts data from the session data 502 and stores the data as training data 506. For example, data extraction 504 accesses and extracts session data for a plurality of sessions within a predefined time period. Some examples of a predefined time period include a beginning and end date in the last year, a most recent six months, a most recent few weeks, and the like.

In some examples, the data extraction 504 determines a subset of the plurality of sessions for the predefined period that comprise user feedback. For example, a user may be prompted for feedback during a session, such as via a prompt asking how likely they are to recommend the website to a friend or relative, how they would rate their experience on a given website, how do they rate a particular webpage, or the like. In some examples, the feedback is numeric (e.g., 0-5, 0-10) and/or in textual form. This subset is stored as training data 506.

In some examples, data extraction 504 determines a subset of the plurality of sessions for the predefined period that comprise user feedback at one or more predefined points within a session. For example, a prompt for user feedback may be provided at different moments in a session and data extraction 504 may only extract sessions that comprise user feedback at a particular point in the session. In one example, data extraction 504 only extracts session data for sessions where user feedback is provided on a last page that is viewed and/or a page before a last page that is viewed. This subset is stored as training data 506.

In some examples, data extraction 504 uses the user feedback to generate labels for the session data. For example, data extraction 504 or other part(s) of the computing system analyzes the user feedback to determine if the user is likely frustrated or not frustrated with their experience in the session. For example, if the feedback comprises a score from 0-5, data extraction 504 can determine that a score of 3 or lower indicates that the user is frustrated and a score above 3 indicates that a user is not frustrated. In another example, if the feedback comprises a score from 0-10, data extraction 504 can determine that a score of 7 or lower indicates that the user is frustrated and a score above 7 indicates that a user is not frustrated. Data extraction 504 stores the generated labels for each session and the session data for each session as training data 506. Each label comprises a value indicating that a user was frustrated or not frustrated with a session. In one example, the user feedback comprises a score and generating the labels comprises generating a label corresponding to where the score falls within a score range, as explained with the examples above. In some examples, the user feedback also comprises textual data that is used to do a qualitative analysis of the results of the model.

The model builder 508A uses the training data 506 to train a first machine learning model 510A to generate an initial frustration score based on values derived for a set of features for each session in a given set of session. The first machine learning model 510A is tested until the model achieves the desired performance and is ready to use for predictions.

The model builder 508B uses the training data 506 and the output of the first machine learning model 510A to train a second machine learning model 510B to generate a final frustration score based on the initial frustration score and features derived for each session of a given set of sessions. The first machine learning model 510B is tested until the model achieves the desired performance and is ready to use for predictions.

A prediction request component 512 receives requests for a prediction from the computing device(s) 518, or other computing system. In one example, the prediction request is a request for a frustration score for one or more sessions. After receiving the prediction request 512, a frustration score is generated and provided, as described with respect to FIG. 6. In some examples, the frustration score is a value between 0 and 100 where a lower number indicates that a user is less frustrated, and a higher number indicates that a user is more frustrated.

The first machine learning model 510A and the second machine learning model 510B can be periodically retrained (e.g., at a fixed time period or when it is determined that the models are outdated). To do so, the data extraction 504 extracts new data from the session data 502 for a predetermined time period (e.g., in the last month, six months or the like) and stores the data as training data 506. Each model is then trained on the new data as explained above.

Any one or more of the modules described herein may be implemented using one or more processors (e.g., by configuring such one or more processors to perform functions described for that module) and hence may include one or more of the processors. Any one or more of the modules described may be implemented using hardware alone (e.g., one or more of the processors of a machine) or a combination of hardware and software. For example, any module described of the machine learning modeling system 500 may physically include an arrangement of one or more of the processors (e.g., a subset of or among the one or more processors of the machine) configured to perform the operations described herein for that module. As another example, any module of the machine learning modeling system 500 may include software, hardware, or both, that configure an arrangement of one or more processors (e.g., among the one or more processors of the machine) to perform the operations described herein for that module. Accordingly, different modules of the machine learning modeling system 500 may include and configure different arrangements of such processors or a single arrangement of such processors at different points in time. Moreover, any two or more modules of the media machine learning modeling system 500 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 6:
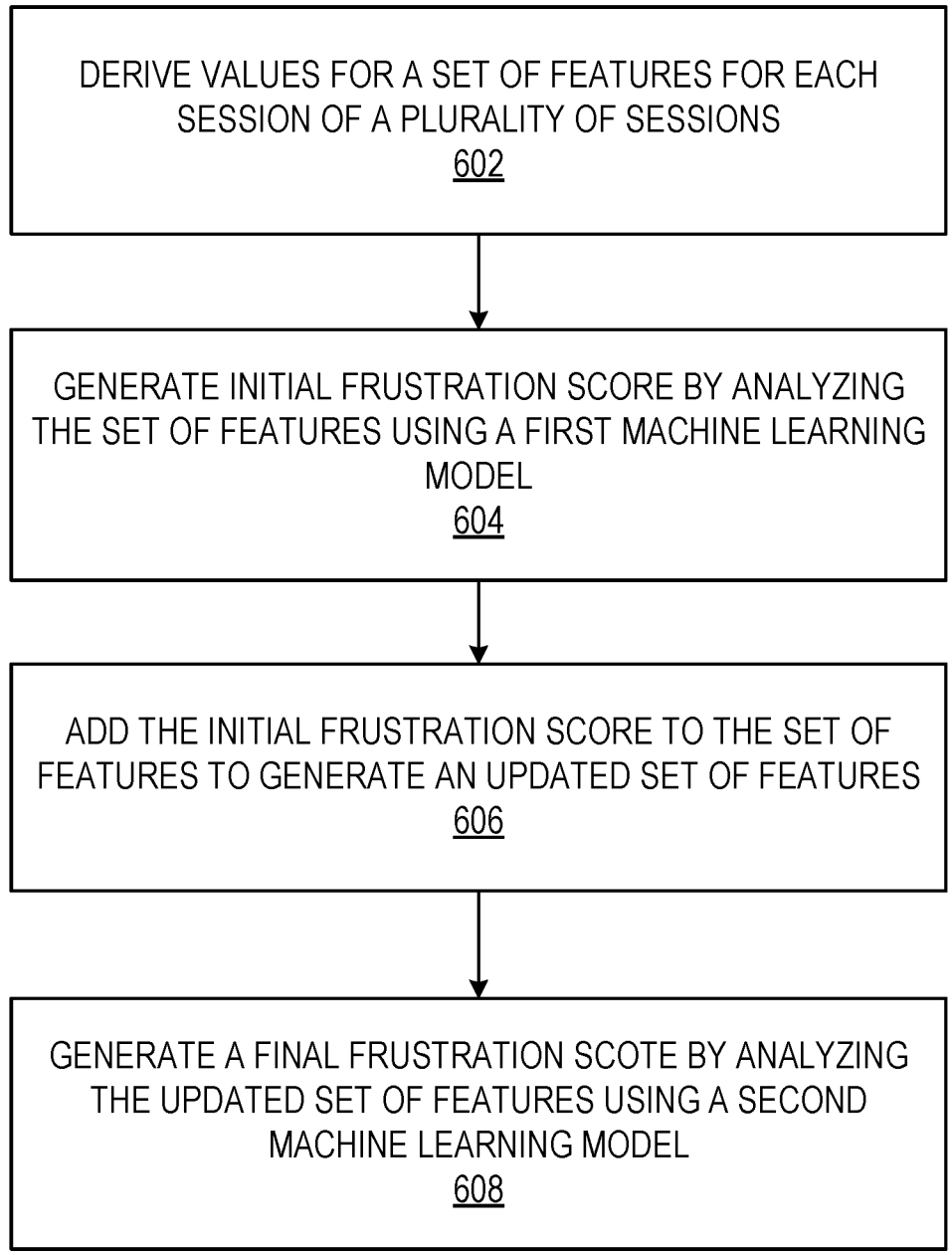
FIG. 6 is a flowchart for a process, in accordance with some examples.

FIG. 6 is a schematic diagram illustrating a process 600 for generating a frustration score for one or more sessions. In operation 602, a computing system (e.g., experience analytics server system 124 or experience analytics server 116) derives values for a set of features for each session of a plurality of sessions. In some examples, each session comprises one or more actions performed by a given user on one or more webpages of a website.

As explained above, the set of features can comprise one or more features, such as a rage click, multiple use element, low activity, any JavaScript error, a JavaScript error after a click, excessive hovers, multiple button interactions, multiple field interactions, load time, any API error, an API error after a click, looping, page not consumed, custom error, dead click, dead link, page reload, blank page, thrashed cursor, dead zoom, application not responsive, application crash, and so forth. A rage click is where an element in a page was clicked a predetermined number of times (e.g., 3 or 5) in a predetermined amount of time (e.g., less than 2 seconds). A multiple use element is an element that was clicked at least a predetermined number of times (e.g., 3 or 5). Low activity is where a user did not click on the page after more than a predetermined amount of time hovering (e.g., 10 or 15 seconds) indicating that the user may not have interacted with the page.

Any JavaScript error is where a JavaScript error occurred on the page but not necessarily because of the user interacting with the page by clicking. A JavaScript error after a click is a JavaScript error that occurred on the page at most a predetermined amount of time after a click (e.g., at most 1 or 2 seconds).

Excessive hovers is where an element was hovered over at least a predetermine number of times (e.g., 3 or 5) with a total hovering time of at least a predetermine amount of time (e.g., at least 3 or 5 seconds). Multiple button interactions is where a button was clicked at least a predetermined number of times (e.g., at least 3 or 4 times). Multiple field interactions is where a field was clicked at least a predetermined number of times (e.g., at least 3 or 5 times). Load time is the amount of time the page took to load.

Any API error is where an API error occurred on the page but not necessarily because of the user interacting with the page by clicking. An API error after click is where an API error occurred on the page at most a predefined amount of time after a click (e.g., at most 1 or 2 seconds).

Looping is a proportion of same URLs visited during the session indicating that the user is going back and forth. Page not consumed is a proportion of pages where the user spent less than a predetermined amount of time (e.g., 2 or 3 seconds) and did less that a predefined number of clicks (e.g., 2 or 3). Custom error collects any text displayed on a user's screen, such as text message in banners or pop ups or in a form field based on a user action (e.g., please enter a valid email).

Dead click is where a user clicked on a non-clickable item. Dead link is where a user clicked on a link anchor that is not redirecting them. In some examples, dead link is different from when the destination link is broken. With a dead link the system is looking at the <a> tag in html code not being responsive.

Page reload is where a page is being frequently reloaded. The frequency can be a predefined number such as more than 3 times.

Blank page is a page that is not rendered correctly, such that it is blank or only a header is rendered. Thrashed cursor is where a user jerks the cursor around erratically indicating frustration or confusion on a page.

Dead zoom is a scenario in a mobile or other application where a user tries to pinch to zoom but it is not zoomable. Application not responsive is another scenario in a mobile or other application where an application hangs (such as by detecting an "Application Not Responding" (ANR) error for an Android device. Application crash is another scenario in a mobile or other application where the application crashes.

To derive values for each of these features, the computing system analyzes the session data to determine a value for each feature. In some cases, the value may be zero if the feature did not occur in a session (e.g., there was no JavaScript error or low activity). In some examples, the computing system determines a value per page (e.g., pageview) in the session data. In this example, the computing system averages the values for each feature across the pages for the session. For instance, the computing system may determine that there is a particular feature, such as an excessive hover, in three of ten pages visited during the session. The computing system takes an average of the values to derive the value for that feature so that there are a fixed number of features regardless of the length of session in terms of pageviews.

In operation 604, the computing system generates an initial frustration score for each session of the plurality of sessions by analyzing the set of features for each session of the plurality of sessions using a first machine learning model trained to generate an initial frustration score based on values derived for a set of features for each session of a given set of sessions. For example, the set of features for each session are input into the first machine learning model 510A and the first machine learning model 510A analyzes the set of features for each session and outputs an initial frustration score for each session. In some examples, the initial frustration score is a value between 0 and 100 with a lower number indicating that a user is less frustrated, and a higher number indicating that a user is more frustrated.

In operation 606, the computing system appends the initial frustration score to the set of features to generate an updated set of features for each session. For example, the computing system adds the initial frustration score as a feature to the set of features.

In operation 608, the computing system generates a final frustration score for each session of the plurality of sessions by analyzing the updated set of features using a second machine learning model trained to generate a final frustration score based on the initial frustration score and features derived for each session of a given set of sessions. For example, the set of features for each session are input into the second machine learning model 510B and the second machine learning model 510B analyzes the set of features for each session and outputs a final frustration score for each session. In some examples, the final frustration score is a value between 0 and 100 with a lower number indicating that a user is less frustrated, and a higher number indicating that a user is more frustrated. In some examples, the second machine learning model 510B further generates and outputs a frustration score for each feature of the set of features that led to the final frustration score.

Figure 7:
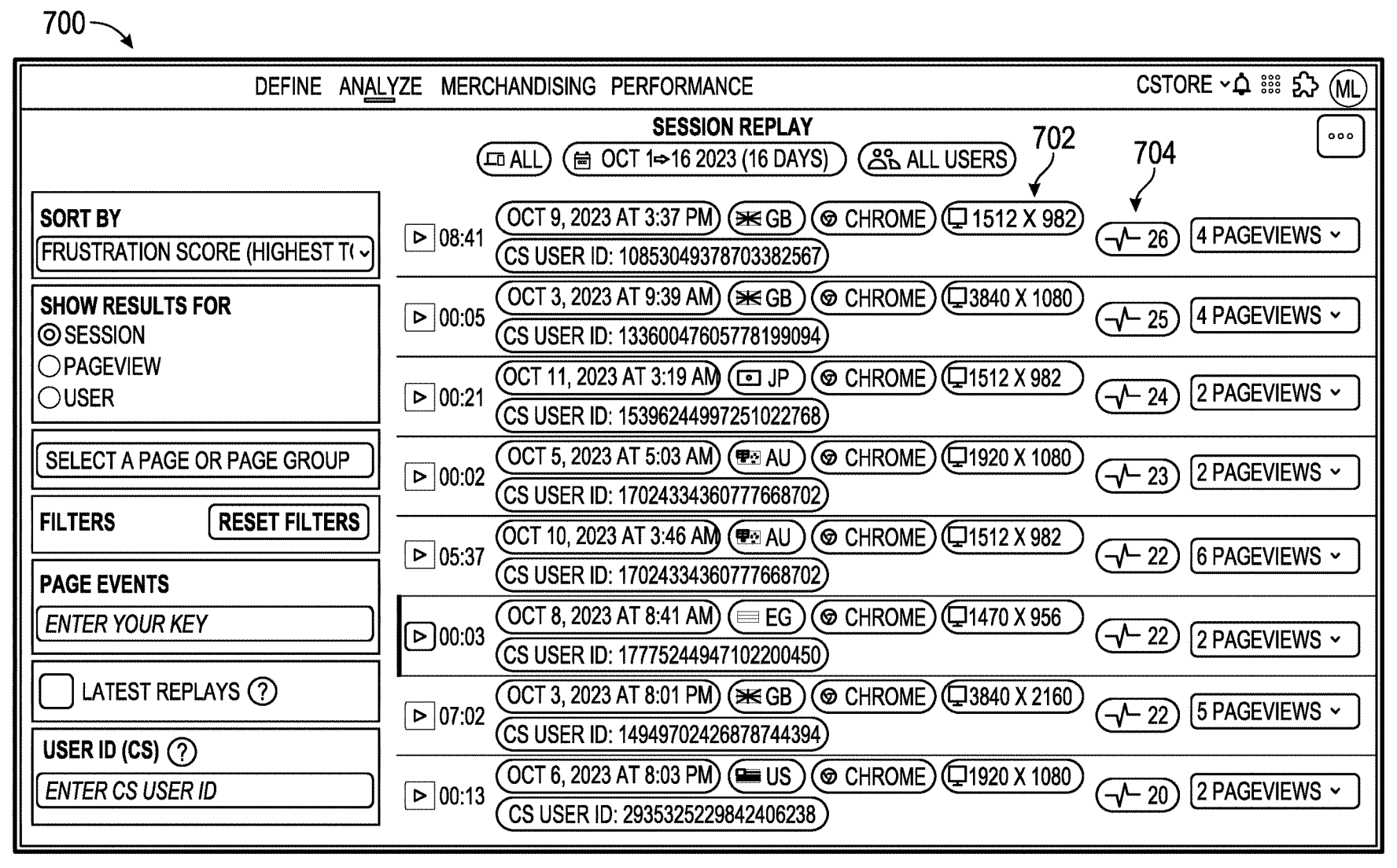

The final frustration score can be utilized in a number of scenarios. In one example, the final frustration score is used to rank the plurality of sessions so that a user can focus on the sessions with the highest frustrations scores to figure out what the issues are and what needs to be done to address the issues. For example, the computing system can rank the plurality of sessions based on the final frustration score for each session and cause display on a computing device (e.g., member client device 102) of at least a subset of the plurality of sessions in ranked order. In one example, only a top percentage of sessions with a frustration score over a predefined threshold are listed. In other examples, all sessions are listed in ranked order. In this way, a user, such as an employee for an entity that implements the website, can focus on those sessions with a higher frustration score to identify potential issues on the website to be repaired. FIG. 7 illustrates an example user interface 700 with a list of sessions 702 ranked by frustration score 704.

Figure 8:
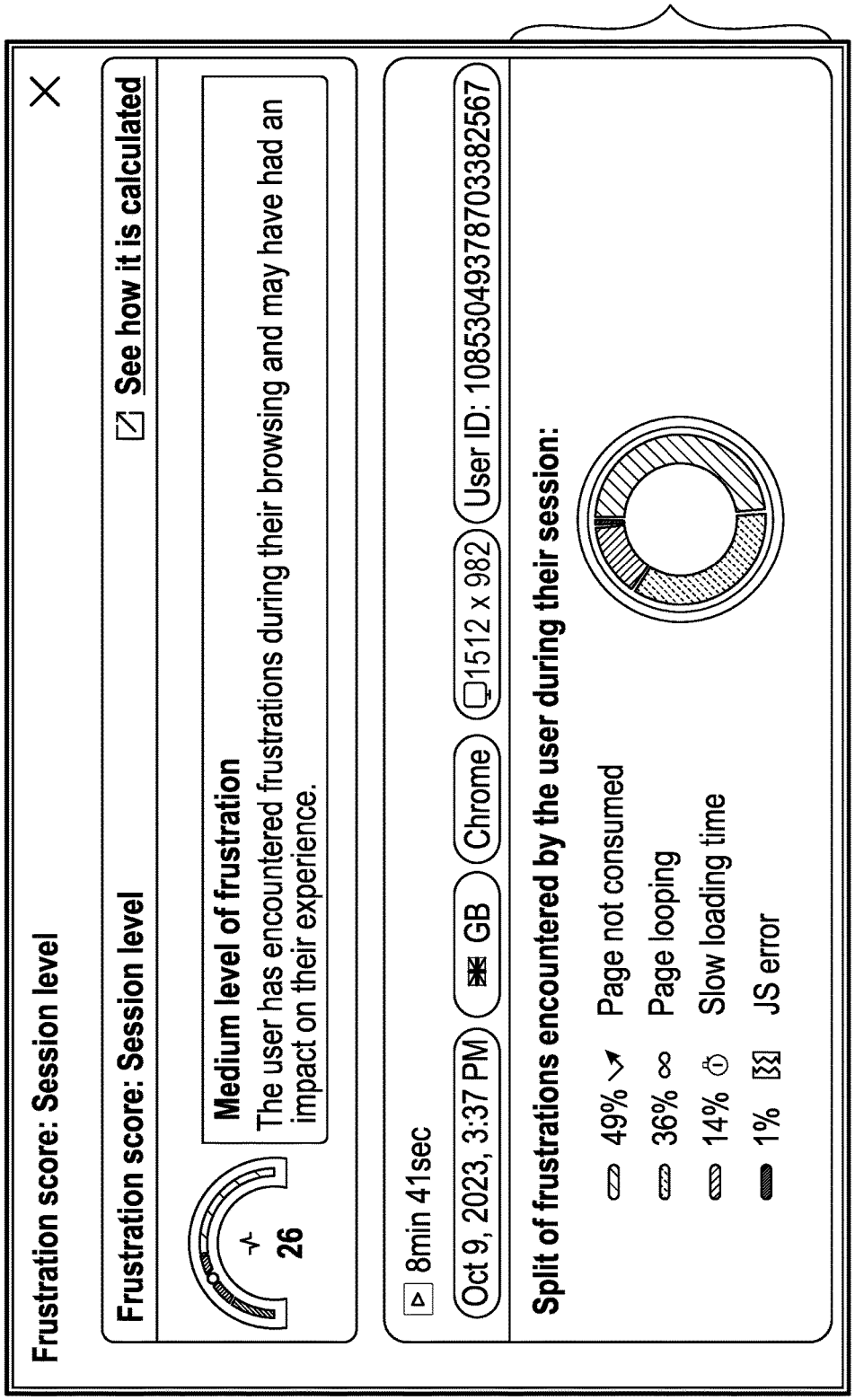

In another example, the computing system ranks the set of features based on the feature frustration score for each feature. A feature frustration score is a score indicating the frustration level for a given feature that led to the final frustration score. For example, the computing system can rank the set of features by feature frustration score for a session or across sessions and cause display on a computing device of at least a subset of the set of features with an indication of how much a feature contributed to the final frustration score for a session or for all sessions. FIG. 8 illustrates an example user interface 800 showing a frustration score at a session level, with a split of frustrations 802 encountered by the user during their session. In the example split of frustration 802, a percentage for each feature is shown indicating a percentage that each feature makes up of the total (e.g., final) frustration score. For instance, the page not consumed feature makes up 49% of the total frustration encountered by the user.

Figure 9:
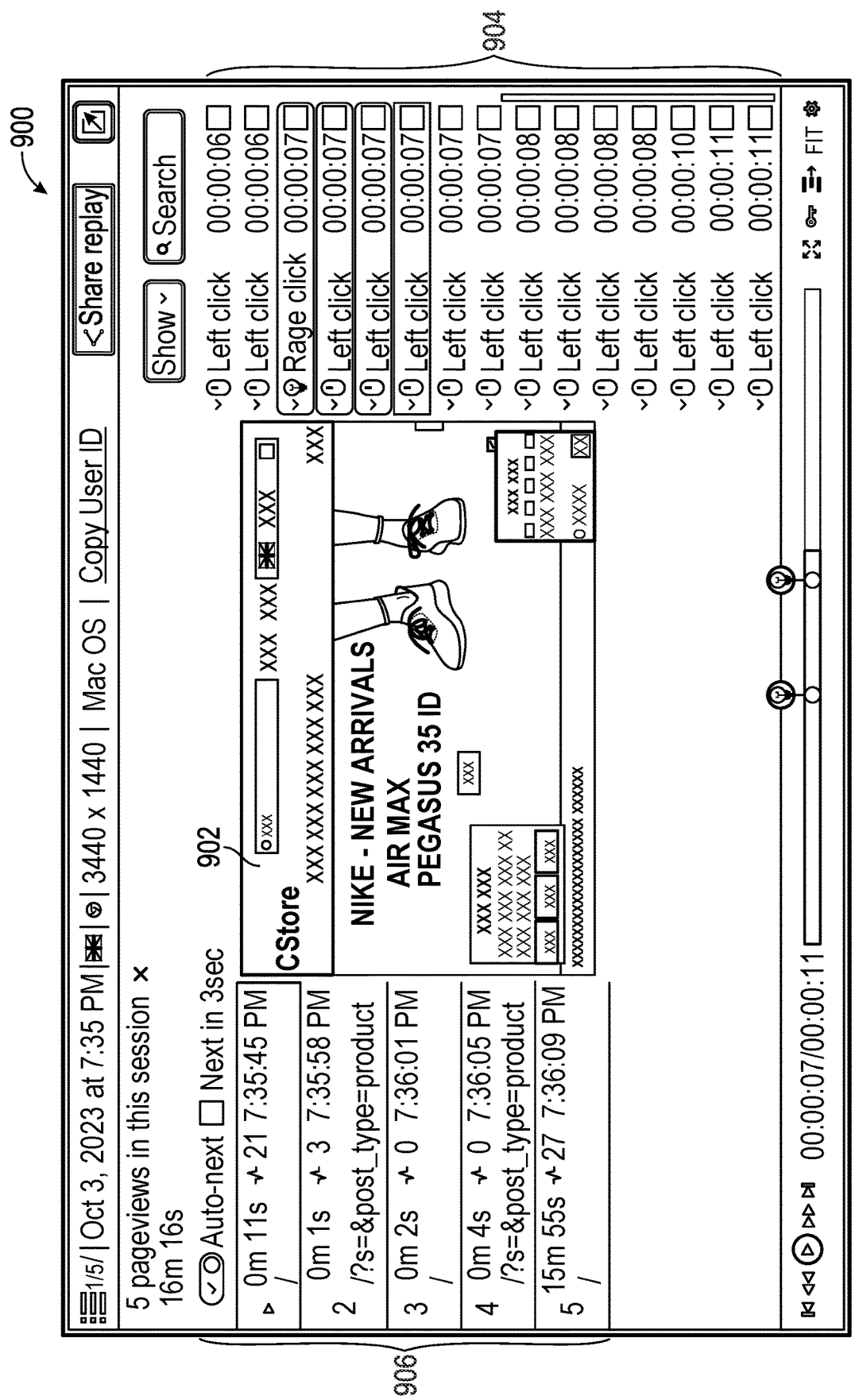

A user can select any of the listed sessions (e.g., as shown in FIG. 7) to replay a particular session. FIG. 9 illustrates an example user interface 900 showing a replay of a particular session. A video 902 replaying the user actions is shown along with a list of actions 904 and further details 906. In some examples, each row of the further details 906 is a pageview and comprises a number indicating a frustration score for the pageview based on a pageview score, as described below. For example, the first pageview in the further details 906 has a pageview score of 21, the second pageview in the further details 906 has a pageview score of 3, and so forth.

In yet another example, the final frustration score can be used to provide further information on why a user exited a website. For example, the computing system can cause display of a data visualization that illustrates a sequence of pages that users visited during a session. The computing system can further provide a final frustration score for each session that followed the sequence of pages to help determine if frustration is a main cause of exiting a website. For example, a higher final frustration score or a frustration score over a specified threshold may indicate that frustration was a primary reason a user exited a website.

In some examples, the computing system generates a pageview score based on the final frustration score for the session. For example, the computing system distributes the final frustration score for a given session across the pageviews (e.g., the pages of the website viewed during the session) to determine a frustration score for each pageview, which is referred to herein as a final pageview-level frustration score. In one example, the final pageview-level frustration score of a given pageview is defined as the contribution of that pageview to the output final frustration score for a session (e.g., an attribution problem). For example:

$s_{i,j}$ is defined as the view i of a session j, and $v(s_j)$ as the final frustration score for session $s_j$ output by the model $v(.)$.

Then, the pageview-level frustration score of $s_{ij}$ can be computed based on its contribution to the value of $v(sj)$. Since each pageview in a session contributes to the overall level of frustration of the session (the final frustration score for the session), the pageview-level frustration score can be computed as the marginal contribution of the given pageview to the final frustration score for the session.

In one example, the computing system computes the Shapley values of each pageview to determine the contribution of each pageview to a final frustration score for a session. One way to express the formula to compute the Shapley values for each pageview is:

$$\varphi(s_{i,j}, v) = \frac{1}{\left|\prod_i\right|} \sum_{\sigma \in \Pi_j} (v([\sigma]_i) - v([\sigma]_{i-1}))$$

where:

$\Pi_j$ is the set of all possible permutations of the view in the session $s_j$.

$|\Pi_j|$ is the cardinality of $\Pi_j$ which is the factorial of the number of views in $s_j$.

$[\sigma]_i$ is the set of views ranked lower than i in the ordering σ.

Computing $\varphi(s_{i,j}, v)$ from the equation above can be very expensive because the computing system would need to call the model over 3.5 million times (10!) for a session having 10 pageviews, as an example. The computation can be drastically reduced, however, based on the assumption that the computation of the final frustration score for a session is independent of the exact order of the view contributing to it. Thus, the exact order of the pageviews before and after a pageview is not important to compute the output of the model. Using an example of a session with ten pageviews, the number of calls to the model would drop to $2^{10}$ (=1024).

For cases where we need to further reduce the computational complexity, we can use approximations of the above formula in paragraph [0082]. One simple approximation of the formula above is using the Monte Carlo estimator to uniformly sample P permutations from $\Pi_j$ to get $\tilde{\Pi}_{j,j}$. For example, if we fix the number of samples to 5, then we will have 5 calls to the model for each pageview score computation, regardless of the actual number of pageviews in the session. To estimate the VFS for all pageviews in a given session, we need to repeat this calculation as many times as the number of pageviews. For example, for a session with 10 pageviews and an approximation with 5 samples, we would have 50 calls to the model.

In some examples, the computing system determines how each pageview (e.g., each webpage of a website viewed in a session) contributed to the final frustration score for a session to generate a raw score for each pageview. For example, the computing system generates raw scores for pageviews in a given session where each raw score indicates how each pageview in the given session contributed to the final frustration score for the given session. In one example, each raw score is a Shapley value, as explained above. The raw score can be positive or negative without any clear bounds. Accordingly, the computing system normalizes the raw scores to fit into the bounds of the final frustration score of the respective session, which is a value between 0 and 100, to match the product expectations to have a score between 0-100 for each pageview. The computing system normalizes the raw scores to generate a final pageview-level frustration score for each pageview. In some examples, the raw scores are normalized using min-max normalization and then multiplied by 100 to fit the range 0-100, but any other function that projects the raw score into the 0-100 can be applied. In some examples, the computing system causes display, such as on a user interface of a computing device, at least a subset of a list of pageviews for the given session with respective final pageview-level frustration scores or with an indication of how much a final pageview-level frustration score contributed to the final frustration score for the respective session. For example, a final pageview-level frustration score can be displayed, a percentage of how much the pageview contributed to the final frustration score for the respective session can be displayed, and so forth.

Shapley values have been applied to machine learning (ML) mostly for explainability purposes. In that case, each feature is considered as a player in a game and the outcome of the ML model is the result of the game. Shapley values are then used to calculate the contribution of each feature to the model's prediction. One popular explainable ML method that uses Shapley values is SHAP. There is an important difference between the use of Shapley values for explainable ML and the above-described use case to compute a pageview-level frustration score: instead of the marginal contribution of each feature that is given as input to the model, the above-described approach computes the marginal contribution of each pageview in a given session. Note that each pageview affects (potentially) all the features fed to the model. As a consequence, while computing the contribution of each feature in the explainable ML context would require to re-train the model for every combination of features, in the above-described approach, this is not necessary.

Shapley values is used above as an example attribution method. It is to be understood that other attribution methods or multi-touch attribution methods could be used in the examples described herein.

Machine Architecture

Figure 10:
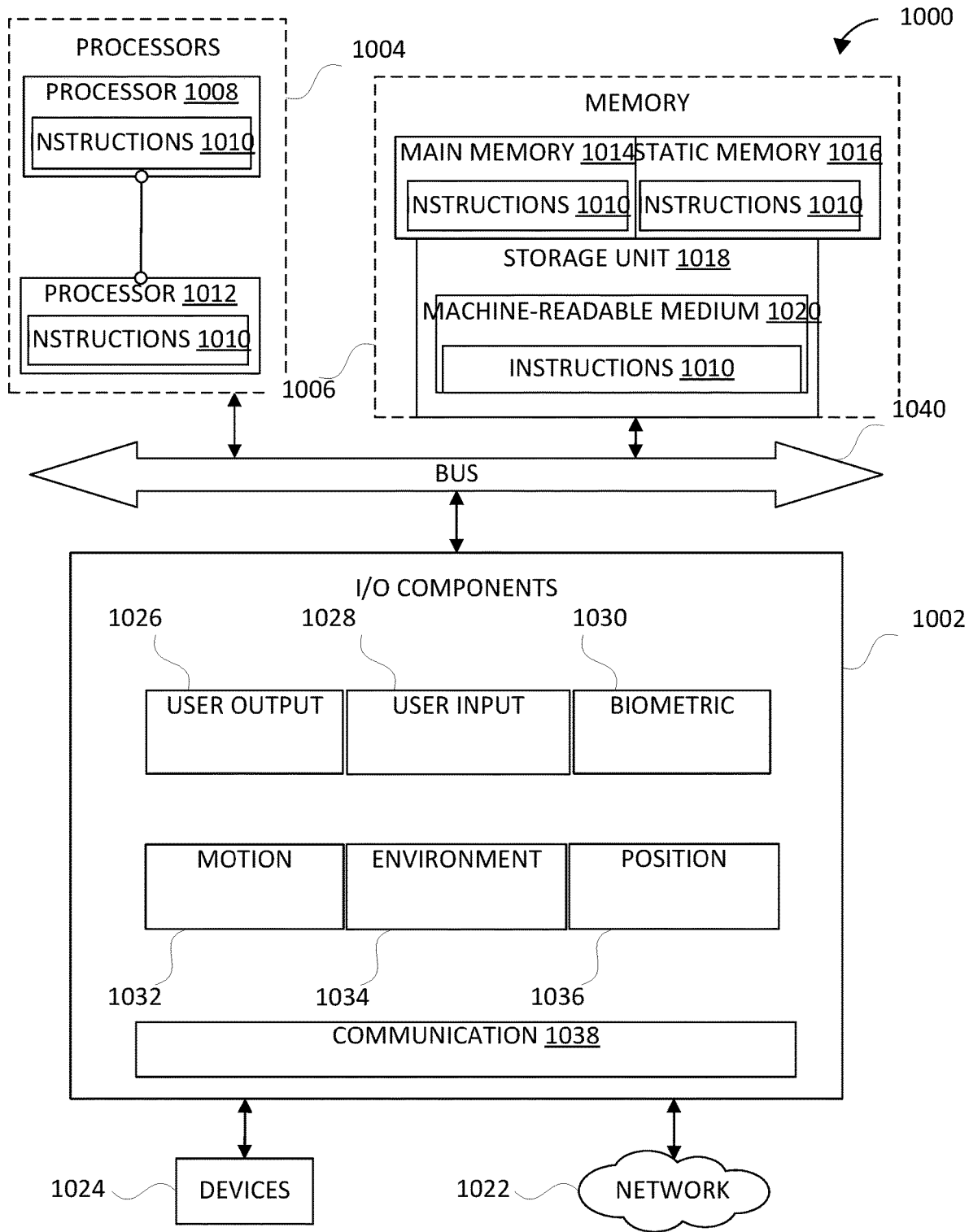
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1010 (e.g., software, a program, an application, an applet, an application, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the member client device 102 or any one of a number of server devices forming part of the experience analytics server 116. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Software Architecture

Figure 11:
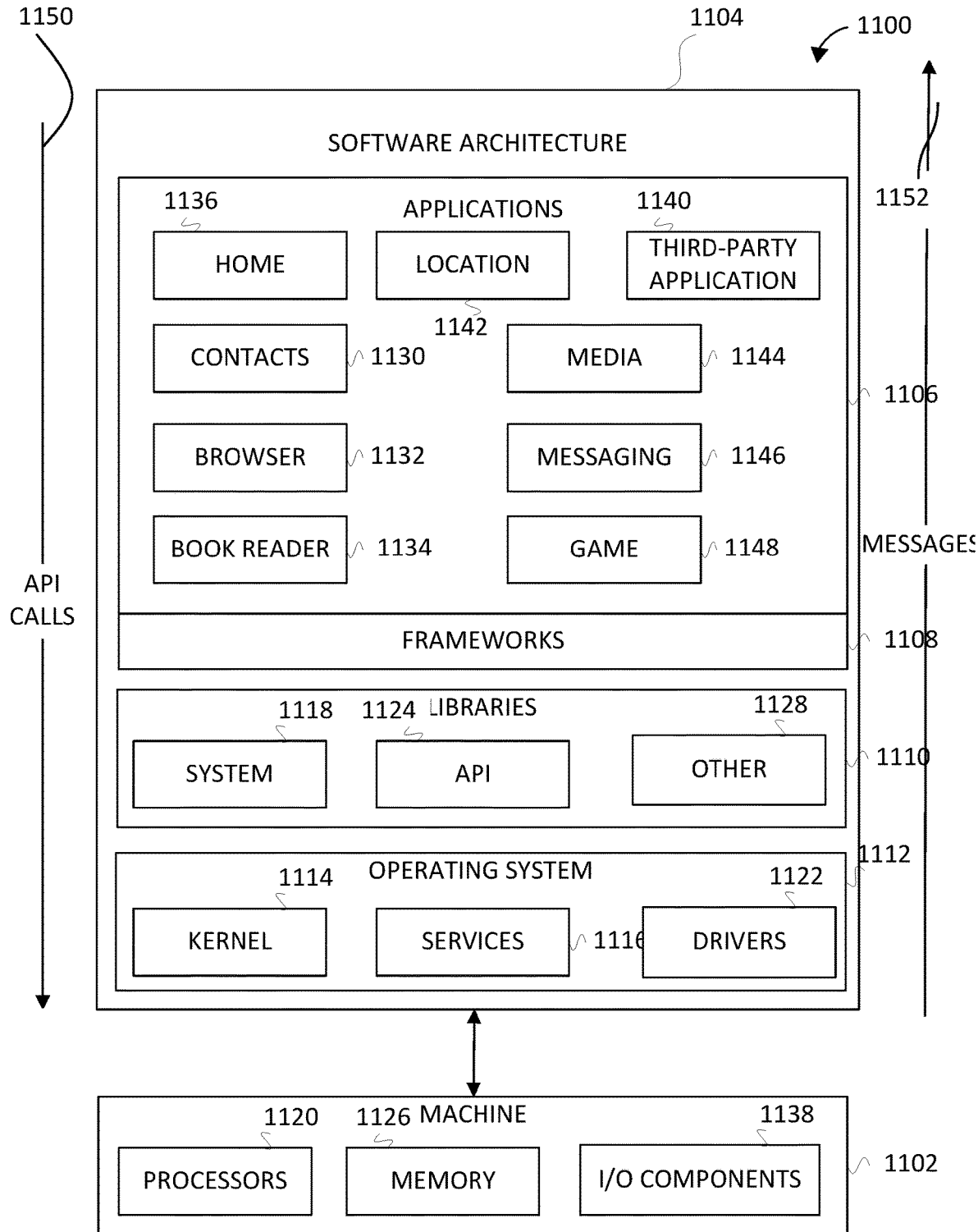
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 606 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method, comprising:
   accessing a first plurality of sessions within a predefined time period, each session comprising one or more actions performed by a given user on one or more webpages of a website;
   extracting a subset of sessions from the first plurality of sessions that each comprise a user feedback score at a predefined point within a session;
   generating a label for each session of the subset of sessions by determining where the user feedback score for each session falls within a score range, the label indicating that a user associated with each session was frustrated or not frustrated;
   generating training data comprising the subset of sessions and the generated label for each session indicating that the user associated with each session was frustrated or not frustrated;
   training, using the training data comprising the subset of sessions and the generated label for each session indicating that the user associated with each session was frustrated or not frustrated, a first machine learning model to generate an initial frustration score based on features derived for each session of a given set of sessions;
   for each session of a second plurality of sessions that each comprise one or more actions performed by a given user on one or more webpages of a website, deriving values for a set of features, each value indicating whether or not a respective feature occurred in the session;
   generating an initial frustration score for each session of the second plurality of sessions by analyzing the derived values for the set of features for each session of the second plurality of sessions using a first machine learning model trained to generate an initial frustration score based on values derived for a set of features for each session of a given set of sessions;
   adding the initial frustration score to the set of features as an additional feature to generate an updated set of features for each session including the initial frustration score; and
   generating a final frustration score for each session of the second plurality of sessions by analyzing the updated set of features using a second machine learning model trained to generate a final frustration score based on the initial frustration score and features derived for each session of a given set of sessions.

2. The computer-implemented method of claim 1, further comprising:
   training, using the training data and output of the first machine learning model, the second machine learning model to generate the final frustration score based on the initial frustration score and the values derived for the set of features for each session of a given set of sessions.

3. The computer-implemented method of claim 1, wherein the first machine learning model comprises a decision tree.

4. The computer-implemented method of claim 1, wherein the second machine learning model comprises a logistic regression model.

5. The computer-implemented method of claim 1, further comprising:
   ranking the second plurality of sessions based on the final frustration score for each session; and
   causing display of at least a subset of the second plurality of sessions in ranked order.

6. The computer-implemented method of claim 1, wherein the second machine learning model further generates a feature frustration score for each feature of the set of features.

7. The computer-implemented method of claim 6, further comprising:
   ranking the set of features based on the feature frustration score for each feature; and
   causing display of at least a subset of the set of features to be displayed with an indication of how much a feature contributed to the final frustration score for a session or for all sessions.

8. The computer-implemented method of claim 1, wherein the set of features comprises one or more of a group comprising: rage click, multiple use element, low activity, any javascript error, a javascript error after a click, excessive hovers, multiple button interactions, multiple field interactions, load time, any API error, an API error after a click, looping, page not consumed, custom error, dead click, dead link, page reload, blank page, thrashed cursor, dead zoom, application not responsive, or application crash.

9. The computer-implemented method of claim 1, further comprising:
   determining raw scores for pageviews in a given session, each raw score indicating how each pageview in the given session contributed to the final frustration score for the given session; and
   normalizing the raw scores to generate a final pageview-level frustration score for each pageview.

10. The computer-implemented method of claim 9, wherein the raw scores are Shapley values of each pageview with respect to the final frustration score for the given session.

11. The computer-implemented method of claim 9, wherein the raw scores are normalized using a min-max normalization and then multiplied by 100 to fit in a 0-100 range.

12. The computer-implemented method of claim 9, further comprising:
   causing display of at least a subset of a list of pageviews for the given session with respective final pageview-level frustration scores or with an indication of how much a final pageview-level frustration score contributed to the final frustration score for the given session.

13. The computer-implemented method of claim 1, wherein each feature comprises an error type or a user action of a specified type.

14. The computer-implemented method of claim 1, further comprising:
   determining an amount that each feature of the set of features contributed to the final frustration score for a first session.

15. The computer-implemented method of claim 14, further comprising:
causing display of a percentage that each feature makes up of the final frustration score.

16. The computer-implemented method of claim 1, further comprising:
causing display of a list of sessions associated with a final frustration score over a predefined threshold.

17. A computing device comprising:
a processor; and
a memory storing instructions that, when executed by the processor, configure the computing device to perform operations comprising:
accessing a first plurality of sessions within a predefined time period, each session comprising one or more actions performed by a given user on one or more webpages of a website;
extracting a subset of sessions from the first plurality of sessions that each comprise a user feedback score at a predefined point within a session;
generating a label for each session of the subset of sessions by determining where the user feedback score for each session falls within a score range, the label indicating that a user associated with each session was frustrated or not frustrated;
generating training data comprising the subset of sessions and the generated label for each session indicating that the user associated with each session was frustrated or not frustrated;
training, using the training data comprising the subset of sessions and the generated label for each session indicating that the user associated with each session was frustrated or not frustrated, a first machine learning model to generate an initial frustration score based on features derived for each session of a given set of sessions;
for each session of a second plurality of sessions that each comprise one or more actions performed by a given user on one or more webpages of a website, deriving values for a set of features, each value indicating whether or not a respective feature occurred in the session;
generating an initial frustration score for each session of the second plurality of sessions by analyzing the derived values for the set of features for each session of the second plurality of sessions using a first machine learning model trained to generate an initial frustration score based on values derived for a set of features for each session of a given set of sessions;
adding the initial frustration score to the set of features as an additional feature to generate an updated set of features for each session including the initial frustration score; and
generating a final frustration score for each session of the second plurality of sessions by analyzing the updated set of features using a second machine learning model trained to generate a final frustration score based on the initial frustration score and features derived for each session of a given set of sessions.

18. The computing device of claim 17, further comprising:
training, using the training data and output of the first machine learning model, the second machine learning model to generate the final frustration score based on the initial frustration score and the values derived for the set of features for each session of a given set of sessions.

19. The computing device of claim 17, wherein the first machine learning model comprises a decision tree.

20. A non-transitory computer-readable storage medium including instructions that, when processed by a computer, configure the computer to perform operations comprising:
accessing a first plurality of sessions within a predefined time period, each session comprising one or more actions performed by a given user on one or more webpages of a website;
extracting a subset of sessions from the first plurality of sessions that each comprise a user feedback score at a predefined point within a session;
generating a label for each session of the subset of sessions by determining where the user feedback score for each session falls within a score range, the label indicating that a user associated with each session was frustrated or not frustrated;
generating training data comprising the subset of sessions and the generated label for each session indicating that the user associated with each session was frustrated or not frustrated;
training, using the training data comprising the subset of sessions and the generated label for each session indicating that the user associated with each session was frustrated or not frustrated, a first machine learning model to generate an initial frustration score based on features derived for each session of a given set of sessions;
for each session of a second plurality of sessions that each comprise one or more actions performed by a given user on one or more webpages of a website, deriving values for a set of features, each value indicating whether or not a respective feature occurred in the session;
generating an initial frustration score for each session of the second plurality of sessions by analyzing the derived values for the set of features for each session of the second plurality of sessions using a first machine learning model trained to generate an initial frustration score based on values derived for a set of features for each session of a given set of sessions;
adding the initial frustration score to the set of features as an additional feature to generate an updated set of features for each session including the initial frustration score; and
generating a final frustration score for each session of the second plurality of sessions by analyzing the updated set of features using a second machine learning model trained to generate a final frustration score based on the initial frustration score and features derived for each session of a given set of sessions.

* * * * *

UNITED STATES PATENT AND TRADEMARK OFFICE
CERTIFICATE OF CORRECTION

| | | |
|---|---|---|
| PATENT NO. | : 12,248,523 B1 | Page 1 of 1 |
| APPLICATION NO. | : 18/427170 | |
| DATED | : March 11, 2025 | |
| INVENTOR(S) | : Liu et al. | |

It is certified that error appears in the above-identified patent and that said Letters Patent is hereby corrected as shown below:

In the Specification

In Column 10, Line 22, delete "510B" and insert --510A-- therefor

In Column 14, Line 8, delete "v(sj)." and insert --v($s_j$).-- therefor

In Column 16, Line 17, delete "I/O" and insert --(I/O)-- therefor

In Column 16, Line 39, delete "1006," and insert --1014,-- therefor

In the Claims

In Column 24, Line 30, in Claim 8, after "comprising:", insert a linebreak

Signed and Sealed this
Nineteenth Day of August, 2025

Coke Morgan Stewart
*Acting Director of the United States Patent and Trademark Office*